United States Patent [19]

Takata

[11] Patent Number: 4,783,181

[45] Date of Patent: Nov. 8, 1988

[54] AUTOMATIC SELF-ALIGNING ROLLER BEARING

[75] Inventor: Hirotoshi Takata, Yokohama, Japan

[73] Assignee: Nippon Seiko Kabushiki Kaisha, Tokyo, Japan

[21] Appl. No.: 166,495

[22] Filed: Mar. 10, 1988

[51] Int. Cl.⁴ .................. F16C 33/36; F16C 33/58
[52] U.S. Cl. ........................... 384/450; 384/558; 384/568; 384/569
[58] Field of Search ............ 384/450, 568, 569, 558, 384/516

[56] References Cited

U.S. PATENT DOCUMENTS 4,227,754  10/1980  Kellström ..................... 308/177
4,345,800  8/1982   Hofmann et al. ............... 384/450
4,557,613  12/1985  Tallian et al. ................. 384/568
4,705,411  11/1987  Kellstrom ..................... 384/450

Primary Examiner—Lenard A. Footland
Attorney, Agent, or Firm—Shapiro and Shapiro

[57] ABSTRACT

In an automatic self-aligning roller bearing including an inner race, an outer race and a plurality of rolling bodies disposed between the inner race and outer race, a radius of each of track grooves on the inner race and a radius of track groove on the outer race have a predetermined relationship established therebetween. Thus, a pressure developed on both the inner and outer races is simultaneously uniformly distributed as seen in the axial direction under a condition in proximity of a designed load whereby a running life of both the inner and outer races can be elongated. Consequently, a well balanced roller bearing of the above-mentioned type having a long running life is provided.

1 Claim, 1 Drawing Sheet

- 2 OUTER RACE
- Rb
- α
- Da
- 3 SPHERICAL ROLLER
- 1 INNER RACE
- Ra
- Rc
- $\frac{dm}{2}$ $$\frac{fe-0.5}{fi-0.5} = -0.5\gamma + 1.05$$

$$\frac{fe-0.5}{fi-0.5} = -0.5\gamma + 1.01$$

AUTOMATIC SELF-ALIGNING ROLLER BEARING

BACKGROUND OF THE INVENTION

1. Field of the Invention

The present invention relates to an automatic self-aligning roller bearing and more particularly to an automatic self-aligning roller bearing which assures a long running life and is suitably employed as a bearing usable for installations and apparatus requiring a long period of durability as well as as a bearing usable for machines and equipments requiring a high level of reliability.

2. Related Background Art

With respect to an automatic self-aligning roller bearing, a contact condition under track surfaces of the inner and outer races come in contact with a plurality of rollers at the barrel portion of the latter is not always determined from the viewpoint of elongated running life associated with rolling fatigue. For instance, in order to reduce frictional torque and temperature raising during usage for the bearing, there has been hitherto made a proposal for determining a ratio of a radius of curvature on the track surface of the inner race to a radius of curvature on the outer race as disclosed in an official gazette of Japanese Patent Publication No. 31328/1980. A purpose of the prior invention as described in the official gazette lies in that when a radius of groove on the inner race is represented by Rb, a radius of groove on the outer race is represented by Ra and a radius of each of the rollers at the barrel portion is represented by Rc, ratios of the radiuses of curvature as identified by Rc/Rb and Rc/Ra are determined in accordance with the following inequality.

$$\frac{1 - (Rc/Rb)}{1 - (Rc/Ra)} > 0.5 + 0.5 \left(\frac{1+\gamma}{1-\gamma}\right)^{1.5}$$

In the above inequality, $\gamma$ is equal to Da cos $\alpha$/dm, Da represents the maximum diameter of each of the rollers, $\alpha$ does a contact angle in the bearing and dm does a diameter of pitch circle of the rollers.

If the track surfaces of both the inner and outer races and the barrel portion of each of the rollers are formed so as to satisfactorily meet the above inequality, sufficient effect can be expected with respect to frictional torque and temperature raising.

However, in a case where a plurality of inner dimensions of components constituting the bearing are determined in that way, a pressure on the contact surface of one track race is not uniformly distributed as seen in the axial direction in spite of the fact that a pressure on the contact surface of the other track race is substantially uniformly distributed as seen in the axial direction. Thus, a running life of the bearing associated with rolling fatigue is determined by the track race side where a pressure on the contact surface is not uniformly distributed, resulting in a long running life as bearing being attained only with much difficulties.

SUMMARY OF THE INVENTION

The present invention has been made with the foregoing background in the main and its object resides in providing an automatic self-aligning roller bearing of which long running life can be expected and which is preferably employable as a bearing for installations and apparatuses requiring a long period of durability as well as as a bearing for machines and equipments requiring a high level of reliability.

To accomplish the above object, the present invention provides an automatic self-aligning roller bearing wherein when a radius of track groove on the inner race is represented by Rb, a radius of track groove on the outer race is represented by Rb, a radius of each of a plurality of rolling bodies at the barrel portion is represented by Rc, a diameter of pitch circle of the rolling bodies is represented by dm and a contact angle in the bearing is represented by $\alpha$, the following relationship is established between the radius of track groove on the inner race and the radius of groove track on the outer race in order that a pressure on the contact surface on which both the inner race and the outer race come in contact with the rolling bodies is uniformly distributed as seen in the axial direction, $$0.5\gamma - 1.01 \leq \frac{fe - 0.5}{fi - 0.5} \leq -0.5\gamma + 1.05$$

where $$fi = \frac{Rb}{2Rc}, fe = \frac{Ra}{2Rc} \text{ and } \gamma = \frac{Da}{dm} \cos \alpha.$$

As is readily apparent from the above formula, a combination of the inner race and the outer race in respect of their groove radius is determined merely by $\gamma$. Thus, if various dimensions of the bearing, that is, a diameter of each of the rollers, a diameter of pitch circle of the rollers and a contact angle are determined, a combination of the optimum values relative to fi and fe can be determined easily. In practice, it is sufficient that a designing load is given in order to determine fi and fe. Consequently, the optimun values of fi and fe can be easily determined in dependence on a load exerted on a bearing having the same configuration. Once a combination of fi and fe is determined in the above-described manner, a pressure developed on both the inner and outer race is uniformly distributed as seen in the axial direction.

Other objects, feature and advantages of the present invention will become readily apparent from a reading of the following description which has been made with reference to the accompanying drawings.

DETAILED DESCRIPTION OF THE PREFERRED EMBODIMENT

Now, the present invention will be described in a greater detail hereunder with reference to the accompanying drawings which illustrate a preferred embodiment thereof.

In fact, the present invention is based on a technical knowledge which has been obtained as a result of variety of research and development works conducted with the use of a number of automatic self-aligning roller bearings having various shape and various dimensions in terms of a radius of groove on the outer race, a radius of groove on the inner race and a radius of each of a plurality of rollers at the barrel portion in order to assure that a pressure developed on a contact surface on which the rollers contact with both the inner race and the outer race can be kept substantially constant as seen in the axial direction of the roller bearing by properly selecting a ratio of the groove radius of the inner race to a radius of the groove radius of the outer race.

Figure 1:
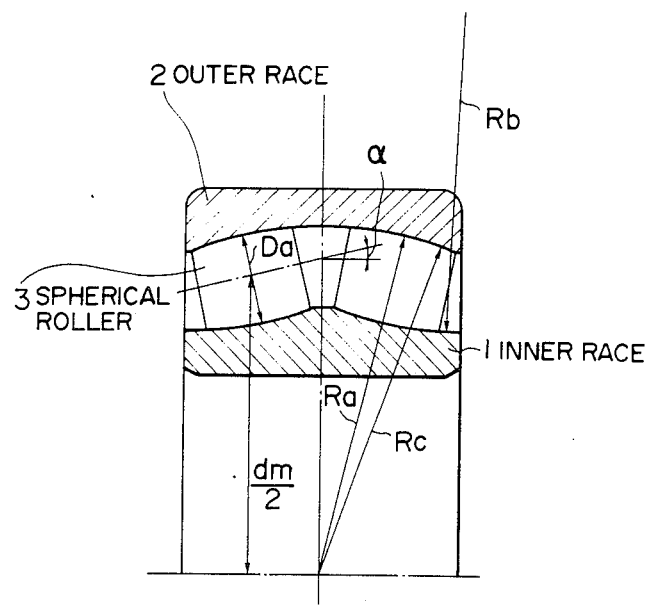
FIG. 1 is a fragmental sectional view of an automatic self-aligning roller bearing in accordance with an embodiment of the present invention.

FIG. 1 is a fragmental sectional view of an automatic self-aligning roller bearing in accordance with an embodiment of the invention. In the drawings, reference numeral 1 designates an inner race, reference numeral 2 does an outer race and reference numeral 3 does a spherical roller. As in apparent from the drawing, the roller bearing of the invention is so constructed that the inner race 1 has track surfaces each of which groove radius as measured from a certain point located outwardly of the outer race 2 is represented by Rb, the outer race 2 has a track surface of which groove radius as measured from the center axis is represented by Ra and each of the spherical rollers 3 has a barrel portion of which radius as measured from the center axis of the roller bearing is represented by Rc and has a rolling surface of which the maximum diameter is represented by Da. Further, each of the spherical rollers 3 has a contact angle a which is defined by the center axis of the spherical roller 3 and a line extending in parallel with tee center axis of the roller bearing, and a diameter of pitch circle of the spherical rollers 3 is represented by dm. Among the aforesaid dimensions a relationship as represented by the following formula is established.

$$-0.5\gamma + 1.01 \leq \frac{fe - 0.5}{fi - 0.5} \leq -0.5\gamma + 1.05 \quad (1)$$

where $$fi = \frac{Rb}{2Rc}, fe = \frac{Ra}{2Rc} \text{ and } \gamma = \frac{Da}{dm} \cos \alpha.$$

Figure 2:
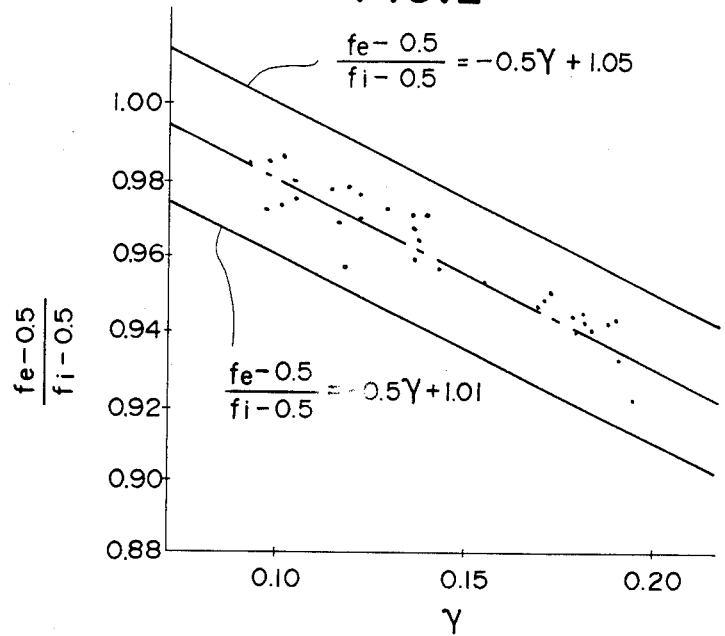
FIG. 2 is a diagram illustrating a relationship between a relational value representative of a ratio of a radius of groove on the outer race to a radius of groove on the inner race as identified by fe−0.5/fi−0.5 and a value identified by $\gamma$=Da cos $\alpha$/dm for the roller bearing shown in FIG. 1.

The above formula (1) is prepared by arithmetically processing a number of results plotted on FIG. 2. Specifically, FIG. 2 illustrates in the form of a diagram a relationship between a value relative to a ratio of the optimum groove radius of the outer race to the optimum groove radius of the inner race as identified by fe−0.5/fi−0.5 and a value with which a substantial configuration of the roller bearing is determined as identified by $\gamma = Da \cos \alpha/dm$, wherein the relationship is obtained by way of the steps of preparing a series of automatic self-aligning roller bearings each of which has different size and dimension, setting a load to be exerted on each of the roller bearings, looking for the optimum groove radius for both the inner race and the outer race for each of the roller bearings so as to assure that a pressure developed on a contact surface on which the rollers contact with both the inner race and the outer race is uniformly distributed as seen in the axial direction for each of dimensional groups of the roller bearings and then calculating the optimum groove radius with the prepared roller bearings.

Consequently, it is found that a considerable number of roller bearings are distributed substantially on an identical line and further when a certain range is presumed, almost of the roller bearings are involved within the presumed range. The formula (1) is obtained when the above-mentioned fact is represented in the form of an arithmetical formula. Accordingly, when radiuses of grooves on the inner and outer races and a radius of each of the rollers at the barrel portion are determined so as to satisfactorily meet the formula (1) and an automatic self-aligning roller bearing is then designed and produced, it follows that a pressure developed on the rollers is uniformly distributed as seen in the axial direction. Thus, there is no fear that an edge load is exerted at the position located in the proximity of the end face of each of the rollers.

Since the automatic self-aligning roller bearing of the invention is constructed in the above-described manner, a pressure on both the inner and outer races is uniformly distributed as seen in the axial direction under a condition approximate to a designing load. This causes a running life of both the inner and outer races to be elongated remarkably whereby a well-balanced automatic self-aligning roller bearing having a long running life is provided.

As another advantageous feature of the roller bearing of the invention is that since a stress appearing in both the outer and inner races is substantially uniformly distributed even under a load other than that approximate to the designing load, a loading capacity of the roller bearing can be most effectively improved by designing its strength in a well-balanced state.

I claim:

1. An automatic self-aligning roller bearing of the type including an outer race, an inner race and a plurality of rolling bodies disposed between said inner race and said outer race, wherein when a radius of track groove on the outer race is represented by Ra, a radius of each of track grooves on the inner race is represented by Rb, a radius of each of said rolling bodies at the barrel portion thereof is represented by Rc, the maximum diameter of each of the rolling bodies is represented by Da, a diameter of pitch circle of the rolling bodies is represented by dm, and a contact angle in the roller bearing is represented by α, the radius of track groove of the inner race and the radius of track groove on the outer race have a relationship established therebetween which is represented by the following formula, $$-0.5\gamma + 1.01 \leq \frac{fe - 0.5}{fi - 0.5} \leq -0.5\gamma + 1.05$$

where $$fi = \frac{Rb}{2Rc}, fe = \frac{Ra}{2Rc} \text{ and } \gamma = \frac{Da}{dm} \cos \alpha.$$

* * * * *